June 2, 1931. J. G. DOUGLAS 1,808,131
VARIABLE VELOCITY RATIO MECHANISM
Filed July 26, 1930 4 Sheets-Sheet 2

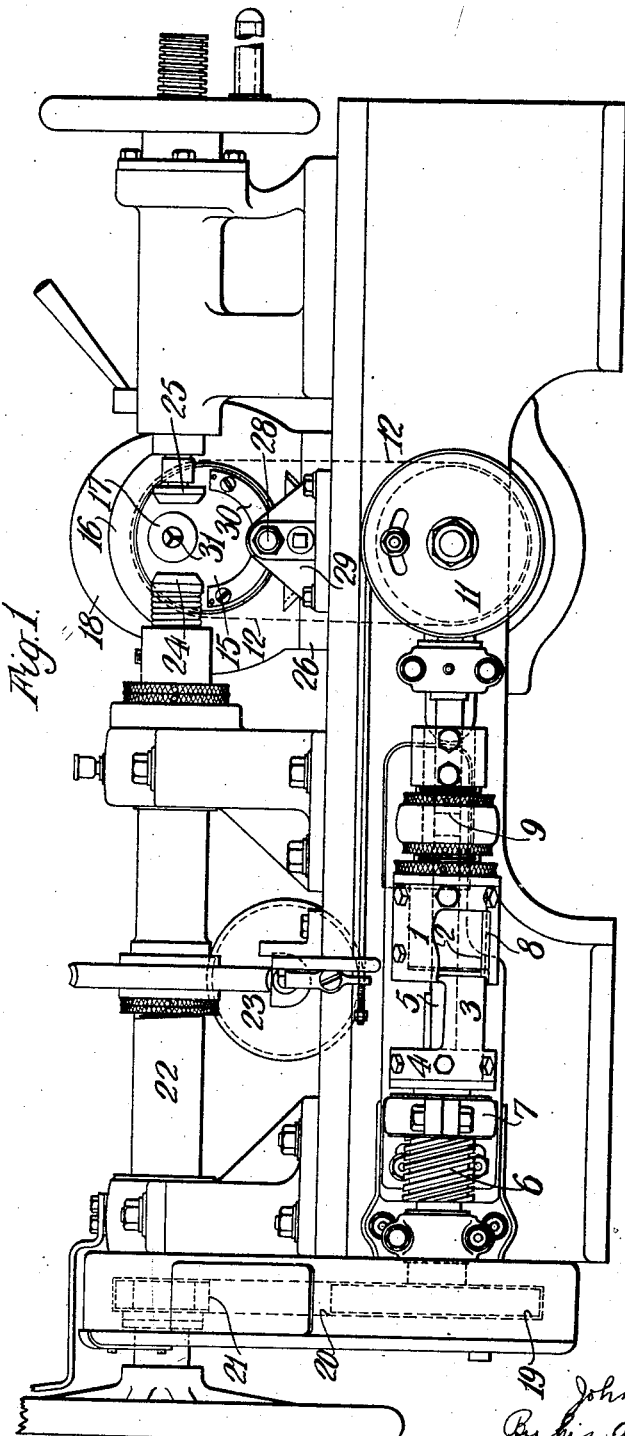

Inventor
John G. Douglas
By his attorneys,
Baldwin & Wight

June 2, 1931.  J. G. DOUGLAS  1,808,131
VARIABLE VELOCITY RATIO MECHANISM
Filed July 26, 1930  4 Sheets-Sheet 3
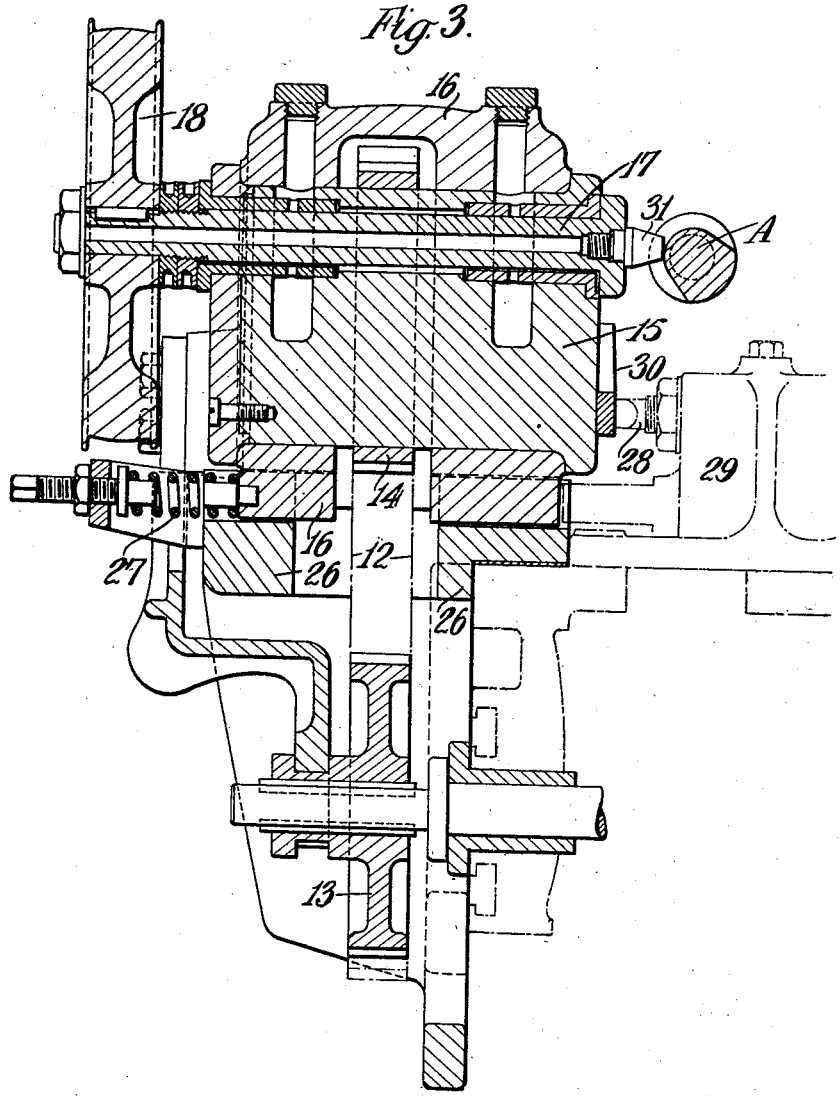

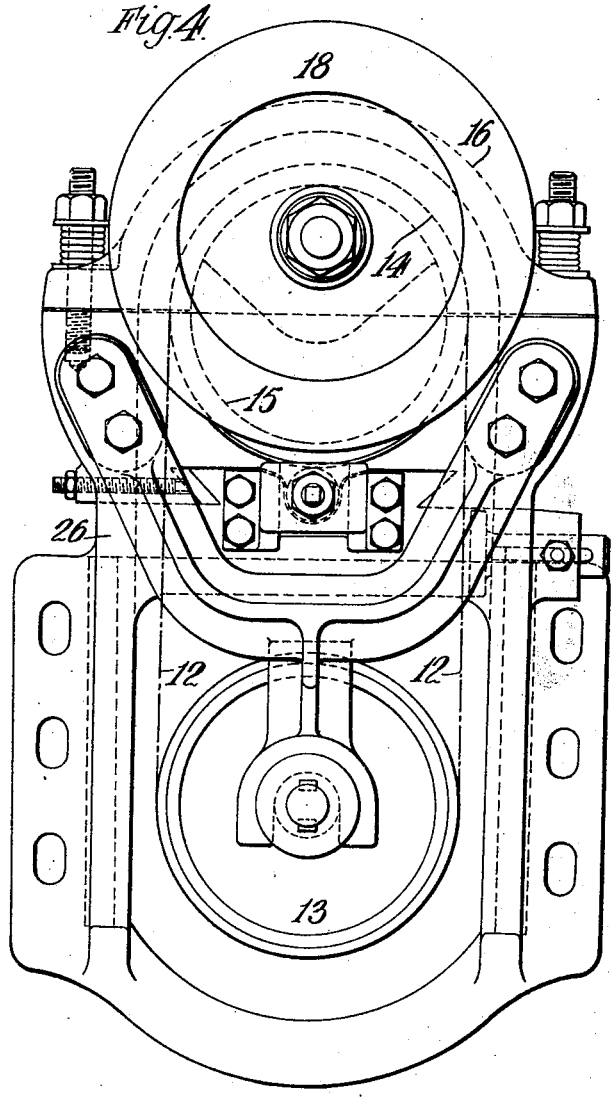

UNITED STATES PATENT OFFICE

JOHN GEORGE DOUGLAS, OF LEAGRAVE LUTON, ENGLAND, ASSIGNOR TO GEORGE KENT, LIMITED, OF LUTON, ENGLAND

VARIABLE VELOCITY RATIO MECHANISM

Application filed July 26, 1930, Serial No. 470,993, and in Great Britain June 26, 1929.

This invention relates to improvements in variable velocity ratio mechanism, and is particularly applicable to machines for generating the cams or worms used in steering gear in which the cam is engaged by one or more pegs or rollers mounted on a rocker arm, and imparts thereto, for equal increments of rotation, either a constant angular movement or a varying angular movement to the rocker arm.

The main object of the present invention is to provide a machine by which a cam of any desired pitch (whether constant or variable) can be manufactured.

According to the present invention there is provided a driving member which is rotated at a constant speed, a driven member, means for moving said members relatively to one another in an axial direction, one of said members having a surface engaged by the other member, the shape or slope of said surface with respect to the axis of rotation determining the ratio of speed of the driving and driven members.

Any desired ratio, whether constant or irregular, can be imparted to the driven member by the shape of the surface and/or by the rate of relative movement in an axial direction between the driving and driven members.

The invention is illustrated in the accompanying drawings, as applied to a cam generating machine employing a milling cutter for producing a cam to be engaged by a peg or roller whose axis is at right angles to that of the cam and parallel with a rocker shaft on which is mounted the rocker arm which carries the peg or roller, the arm being moved in a plane parallel with that containing the axis of the cam.

Figure 7:
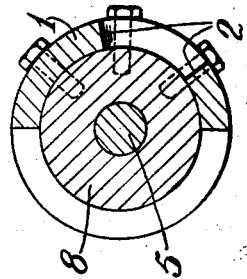
Figure 2:
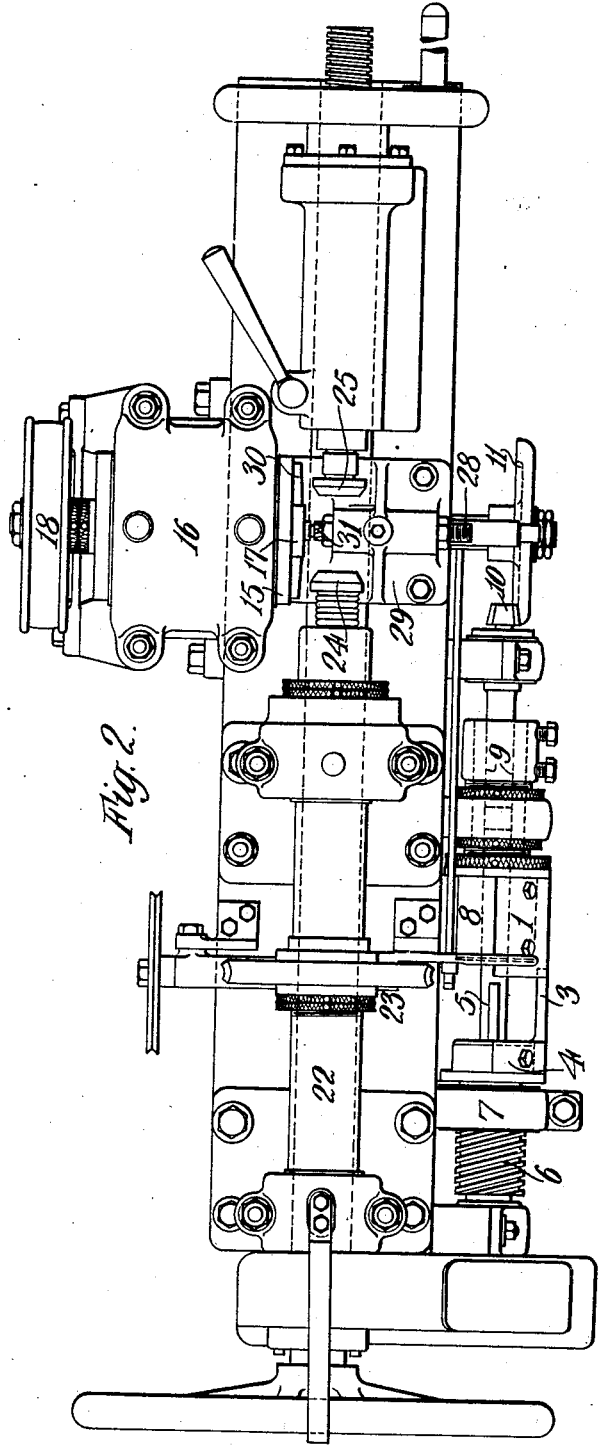
Figure 6:
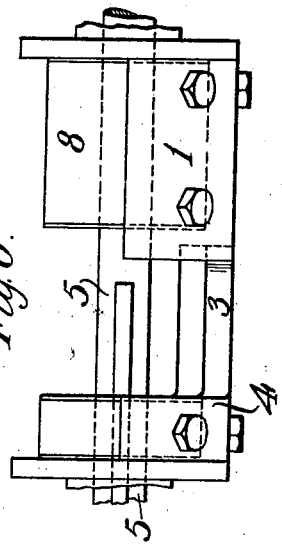
Figure 5:
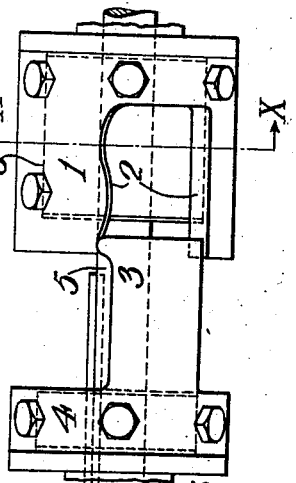

In the drawings, Figure 1 is a side elevation, Figure 2 a plan view, Figure 3 a sectional elevation and Figure 4 a rear elevation of the tool carrier. Figures 5, 6 and 7 are respectively an elevation, a plan and a section on the line x—x, Figure 5, of the variable velocity ratio device.

The movement of the milling cutter is controlled by the variable velocity ratio device, shown more particularly in Figures 5, 6 and 7. The device comprises a sleeve 1 having a portion of its periphery cut away, as indicated at 2, one edge of the cut away portion being formed as a cam surface of the desired shape. This cam surface is engaged by a driving lug 3 which extends from a sleeve 4 slidably but not rotatably mounted on a shaft 5, and the sleeve is fast with an externally screw-threaded member 6 which passes through a nut clamped in a housing 7 secured to the frame of the machine.

The sleeve 1 is secured to a bushing 8 secured to a shaft 9 which drives, through bevel gears 10, 11, a chain 12 passing around a chain wheel 13 and around a chain wheel 14 secured to a housing 15 rotatably mounted in a bearing 16. The housing 15 is bored to receive a tool holder 17, the distance between the axis of the tool holder and the axis of rotation of the tool housing being equal to the radius of the rocker arm in the finished steering gear.

The tool holder is fast with a belt pulley 18 which is driven by a belt in any convenient manner. The shaft 5 is fast with a chain wheel 19 around which passes a chain 20 which is driven from a chain wheel 21 fast on a shaft 22 driven through worm and worm wheel gearing, indicated generally at 23.

Mounted on the shaft 22 is a mandrel 24 which cooperates with a mandrel 25 to carry the cam blank, indicated at A in Figure 3, to be cut.

In operation, assuming that the shaft 22 is being rotated, and that the milling cutter 31 is also being rotated by its pulley 18, motion is transmitted to the shaft 5 which thereby causes the screw threaded sleeve 6 to advance into its nut. The lug 3, fast with the sleeve 4, is thus rotated by the rotational movement of the shaft 5 and is also reciprocated by the movement imparted thereto by the screw-threaded sleeve. Depending on the shape of the cam surface, the axial or rectilinear movement of the lug will cause the rotary motion imparted to the shaft 9 by the shaft to be increased or decreased, or in other words the driven shaft will be driven at speeds depending on the shape of the said cam surface.

It will thus be seen that by suitably shaping the cam surface formed on the sleeve 1, any desired variation in the speed ratio between the shafts 5 and 9, as initially determined by the gearing, can be obtained. In other words, by varying the slope of the cam surface, the ratio can also be varied.

If the slope in one direction of the surface with respect to the axis of rotation produces an increase in the speed, the slope in the other direction will produce a decrease in speed, while if the surface be parallel with the axis of rotation, the speed of the shaft 9 will be the same as that of the shaft 5.

If it be desired to produce a cam which will impart for equal increments of rotation thereof a varying amount of angular movement to the rocker arm in the finished steering gear, the cam surface will be so shaped as to transmit correspondingly varying amounts of motion to the housing carrying the milling cutter, which will be moved across the cam blank A in the same manner as the finished cam will move the peg or roller in the assembled gear.

When the cam produced by this machine is intended for use in automobile steering gears, it is desirable that there should not be perfect contact of the roller or peg with the cam track at all points, but that there should be perfect contact on both flanks of the cam track in the central position thereof, and a certain degree of looseness or backlash when the roller or peg is passing from its central position towards and at either extreme end of its travel.

In order to produce a cam for effecting this, the housing 15 and bearing 16 are slidably mounted on a bed 26, and are forced by springs 27 towards a finger 28 which is adjustably held in a bracket 29 secured to the machine.

A cam surface 30, fast with the face of the housing 15, bears against the fingers 28.

As the housing 15 is rotated, the engagement of the cam 30 with the fixed finger causes the bearing 16, and with it the housing 15, to slide on the bed 26, the cam being so shaped that the tool holder 17 and tool 31 are caused to move slightly towards and away from the axis of the cam blank A, thereby increasing and decreasing the depth of cut of the milling cutter 31.

What I claim is:—

1. In a variable velocity ratio device of the kind referred to, the combination of coaxial driving and driven members, means mounting said driven member for rotation in opposite directions relatively to the driving member during rotation of the latter in a single direction and constituting part of a variable drive, means for rotating the driving member, means for causing relative rectilinear movement between the members during said rotation, a driving lug or the like on one member, a drive-transmitting surface on the other member engaged by the lug, the said surface converting the axial movement into relative rotational movement between the members to an extent determined by its shape.

2. In a machine for cutting a worm or cam, the combination of a rotatable blank carrier, a rotatable tool carrier adapted to receive a tool at a point displaced with respect to the axis of rotation of the tool carrier, and means for rotating the tool carrier at a rate variable with respect to the rotation of the blank carrier comprising a driving member rotatable in timed relationship with the blank carrier, a driven member in driving connection with the tool carrier, and means mounting one of said members operating during rotation in a single direction to rotate the member about its axis relatively to the other member in opposite directions, one of the members having a portion parallel to its axis engaged in a cutaway portion of the other members, said portions having coacting surfaces for automatically transmitting through the said mounting means the drive from the driving to the driven member and for converting the axial movement into relative rotational movement between the members to an extent determined by the shape of the said surface.

3. In a variable velocity ratio device according to claim 1 in which the transmitting surface is provided on a detachable member.

4. In a machine for cutting a worm or cam, according to claim 2, in which the rectilinear movement is effected by a screw threaded member.

5. In a machine for cutting a worm or cam according to claim 2, means for automatically moving the tool carrier toward and away from the axis of the blank carrier as the tool carrier is moved for the purpose specified.

6. In a machine for cutting a worm or cam according to claim 2, in which the rectilinear movement is effected by a screw-threaded member, means for automatically moving the tool carrier towards and away from the axis of the blank carrier for the purpose specified.

7. In a device of the class described, a rotatable shaft, a driving member keyed on said shaft to rotate therewith and slide thereon, a relatively fixed nut in screw-threaded engagement with said members, a shaft having a hollow portion mounted on the first shaft for rotation therewith and limited rocking in either direction relatively thereto, a driven member carried by said hollow portion, one of said members having a cut-away portion provided with a cam surface, and the other member having a portion arranged to extend into said cut-away portion and follow said cam surface.

8. In a device of the class described, the combination of a driving member, means for rotating the driving member, a rotatable driven member, means for rectilinearly moving the driving and driven members relatively to one another, means mounting one of the members for rotation on its axis in opposite directions relatively to the other member during movement of the latter in a single rectilinear direction and having a cut-away portion provided with an irregular surface which is engaged by a portion of the other member, the last mentioned means constituting part of a variable drive, said portion being disposed substantially parallel to the axis of the members, the contour of said surface with respect to the axis of rotation and the rate of rectilinear movement determining the ratio of rotation of the driving and driven members and the direction of rotation of the driven member.

In testimony that I claim the foregoing as my invention, I have signed my name this 15th day of July, 1930.

JOHN GEORGE DOUGLAS.